(12) United States Patent
Hafvenstein et al.

(10) Patent No.: US 11,951,971 B2
(45) Date of Patent: Apr. 9, 2024

(54) SYSTEMS AND METHODS FOR MONITORING A LEVEL OF HYDRAULIC FLUID IN AN AGRICULTURAL SPRAYER

(71) Applicant: CNH Industrial America LLC, New Holland, PA (US)

(72) Inventors: David Hafvenstein, Benson, MN (US); Timothy Patrick Croydon, San Mateo, CA (US); John Patrick Greifzu, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 504 days.

(21) Appl. No.: 17/330,069

(22) Filed: May 25, 2021

(65) Prior Publication Data
US 2022/0268662 A1 Aug. 25, 2022

Related U.S. Application Data

(60) Provisional application No. 63/151,921, filed on Feb. 22, 2021.

(51) Int. Cl.
*H04N 5/44* (2011.01)
*A01B 59/00* (2006.01)
(Continued)

(52) U.S. Cl.
CPC ......... *B60W 10/103* (2013.01); *A01B 59/002* (2013.01); *A01C 23/007* (2013.01); *A01C 23/008* (2013.01); *A01C 23/047* (2013.01); *A01D 41/1274* (2013.01); *A01D 69/00* (2013.01); *A01M 7/0042* (2013.01); *A01M 7/0057* (2013.01); *A01M 7/0085* (2013.01); *A01M 7/0089* (2013.01); *B05B 1/20* (2013.01); *B05B 12/02* (2013.01); *B05B 12/081* (2013.01); *B05B 12/085* (2013.01); *B05B 12/14* (2013.01); *B05B 12/16* (2018.02); *B05B 15/55* (2018.02);
(Continued)

(58) Field of Classification Search
CPC A01C 23/008; A01C 23/047; A01D 41/1274; A01D 69/00; A01M 7/0085; B05B 1/20
See application file for complete search history.

(56) References Cited

U.S. PATENT DOCUMENTS 5,402,110 A 3/1995 Oliver et al.
5,673,025 A 9/1997 Refugio et al.
(Continued)

*Primary Examiner* — Munear T Akki
(74) *Attorney, Agent, or Firm* — Rickard K. DeMille; Rebecca Henkel; Peter K. Zacharias

(57) ABSTRACT

In one aspect, a system for monitoring a level of hydraulic fluid in an agricultural sprayer includes a drive system, a hydraulic fluid system, and a fill level sensor. The system also includes a computing system communicatively coupled to both the drive system and the fill level sensor. The computing system is configured to monitor the level of hydraulic fluid within the hydraulic fluid reservoir based on data received from the fill level sensor. The computing system is further configured to detect a leak condition in the hydraulic fluid system based at least in part on the monitored level of the hydraulic fluid within the hydraulic fluid reservoir and control an operation of the drive system to reduce the ground speed of the agricultural sprayer in response to detecting the leak condition.

19 Claims, 4 Drawing Sheets

(51) Int. Cl.

| | | |
|---|---|---|
| *A01C 23/00* | (2006.01) |
| *A01C 23/04* | (2006.01) |
| *A01D 41/127* | (2006.01) |
| *A01D 69/00* | (2006.01) |
| *A01M 7/00* | (2006.01) |
| *B05B 1/20* | (2006.01) |
| *B05B 12/02* | (2006.01) |
| *B05B 12/08* | (2006.01) |
| *B05B 12/14* | (2006.01) |
| *B05B 12/16* | (2018.01) |
| *B05B 15/55* | (2018.01) |
| *B05B 15/65* | (2018.01) |
| *B08B 3/02* | (2006.01) |
| *B08B 5/02* | (2006.01) |
| *B60W 10/103* | (2012.01) |
| *B60W 10/18* | (2012.01) |
| *B60W 30/18* | (2012.01) |
| *B60W 40/076* | (2012.01) |
| *B67D 7/02* | (2010.01) |
| *B67D 7/36* | (2010.01) |
| *B67D 7/38* | (2010.01) |
| *B67D 7/78* | (2010.01) |
| *B67D 99/00* | (2010.01) |
| *E02F 3/46* | (2006.01) |
| *E02F 9/22* | (2006.01) |
| *G01M 3/32* | (2006.01) |
| *G05D 1/00* | (2006.01) |
| *G07C 5/00* | (2006.01) |
| *G07C 5/08* | (2006.01) |
| *B05B 14/00* | (2018.01) |
| *G01F 23/70* | (2006.01) |

(52) U.S. Cl.
CPC ............... *B05B 15/65* (2018.02); *B08B 3/02* (2013.01); *B08B 5/02* (2013.01); *B60W 10/18* (2013.01); *B60W 10/182* (2013.01); *B60W 30/18118* (2013.01); *B60W 40/076* (2013.01); *B67D 7/02* (2013.01); *B67D 7/0294* (2013.01); *B67D 7/36* (2013.01); *B67D 7/362* (2013.01); *B67D 7/38* (2013.01); *B67D 7/78* (2013.01); *B67D 99/00* (2013.01); *E02F 3/46* (2013.01); *E02F 9/2271* (2013.01); *E02F 9/2275* (2013.01); *G01M 3/3245* (2013.01); *G05D 1/0016* (2013.01); *G07C 5/008* (2013.01); *G07C 5/08* (2013.01); *B05B 14/00* (2018.02); *B08B 2203/0205* (2013.01); *B60W 2520/10* (2013.01); *G01F 23/70* (2013.01); *G05D 2201/0201* (2013.01)

(56) References Cited

U.S. PATENT DOCUMENTS

| | | |
|---|---|---|
| 5,744,701 A | 4/1998 | Peterson et al. |
| 5,748,077 A | 5/1998 | Brandt |
| 7,051,580 B1 | 5/2006 | Lewis et al. |
| 2010/0194554 A1 | 8/2010 | Algulin et al. |
| 2012/0214250 A1* | 8/2012 | Oura ................ G01N 21/80 436/163 |
| 2012/0249333 A1* | 10/2012 | Kunis ................ G01N 1/14 340/603 |
| 2018/0112430 A1* | 4/2018 | Shalon ................ E04H 4/1281 |
| 2018/0336767 A1* | 11/2018 | Barker ................ G08B 21/182 |
| 2020/0267893 A1* | 8/2020 | Grimm ................ A01C 23/022 |
| 2022/0397116 A1* | 12/2022 | Greenboim ......... G01M 3/2807 |

\* cited by examiner

SYSTEMS AND METHODS FOR MONITORING A LEVEL OF HYDRAULIC FLUID IN AN AGRICULTURAL SPRAYER

CROSS-REFERENCE TO RELATED APPLICATIONS

This application is a non-provisional application claiming the benefit of priority under 35 U.S.C. § 119(e) to U.S. Provisional Patent Application No. 63/151,921, filed Feb. 22, 2021, which is hereby incorporated by reference in its entirety for all purposes.

FIELD

The present disclosure generally relates to agricultural sprayers for performing spraying operations within a field and, more particularly, to systems and methods for monitoring a hydraulic fluid system of an agricultural sprayer.

BACKGROUND

Agricultural applicators or sprayers have been used within the industry for delivering an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s). Typically, an applicator or sprayer is pulled as an implement or is self-propelled, and includes a tank, a pump, a boom assembly, and a plurality of nozzles carried by the boom assembly at spaced-apart locations. The boom assembly can include a pair of boom arms, with each boom arm extending to either side of the sprayer when in an unfolded state. Each boom arm may include multiple boom sections, each with a number of spray nozzles (also sometimes referred to as spray tips).

Typically, agricultural sprayers are equipped with a hydraulic fluid system that supplies hydraulic fluid (e.g., oil) to various systems and/or components of the agricultural sprayer. The hydraulic fluid system often includes various piping, lines, and/or hoses for supplying a flow of hydraulic fluid to the various systems and/or components of the agricultural sprayer. In some operational instances, leaks of hydraulic fluid may occur within the hydraulic fluid system (such as from the various piping, lines, and/or hoses), which causes the hydraulic fluid level of the hydraulic fluid system to drop. Current systems lack the capabilities of detecting and controlling these leaks within the hydraulic fluid system, which can result in damage to components of the agricultural sprayer.

Accordingly, improved systems and methods for monitoring a level of hydraulic fluid in an agricultural sprayer and for controlling the sprayer accordingly are desired in the art and would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for monitoring a level of hydraulic fluid in an agricultural sprayer. The system includes a drive system configured to control a ground speed of the agricultural sprayer, a hydraulic fluid system having a hydraulic fluid reservoir, and a fill level sensor configured to provide data indicative of the level of hydraulic fluid within the hydraulic fluid reservoir. The system also includes a computing system communicatively coupled to both the drive system and the fill level sensor. The computing system is configured to monitor the level of hydraulic fluid within the hydraulic fluid reservoir based on data received from the fill level sensor. The computing system is further configured to detect a leak condition in the hydraulic fluid system based at least in part on the monitored level of the hydraulic fluid within the hydraulic fluid reservoir and control an operation of the drive system to reduce the ground speed of the agricultural sprayer in response to detecting the leak condition.

In some aspects, the present subject matter is directed to a method for monitoring a level of hydraulic fluid in an agricultural sprayer. The agricultural sprayer includes a drive system, a hydraulic fluid system having a hydraulic fluid reservoir, and a fill level sensor. The method includes monitoring, with a computing system, the level of hydraulic fluid within the hydraulic fluid reservoir based on data received from the fill level sensor, and detecting, with the computing system, a leak condition in the hydraulic fluid system based at least in part on the monitored level of the hydraulic fluid within the hydraulic fluid reservoir. The method further includes controlling, with the computing system, an operation of the drive system to reduce a ground speed of the agricultural sprayer in response to detecting the leak condition.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
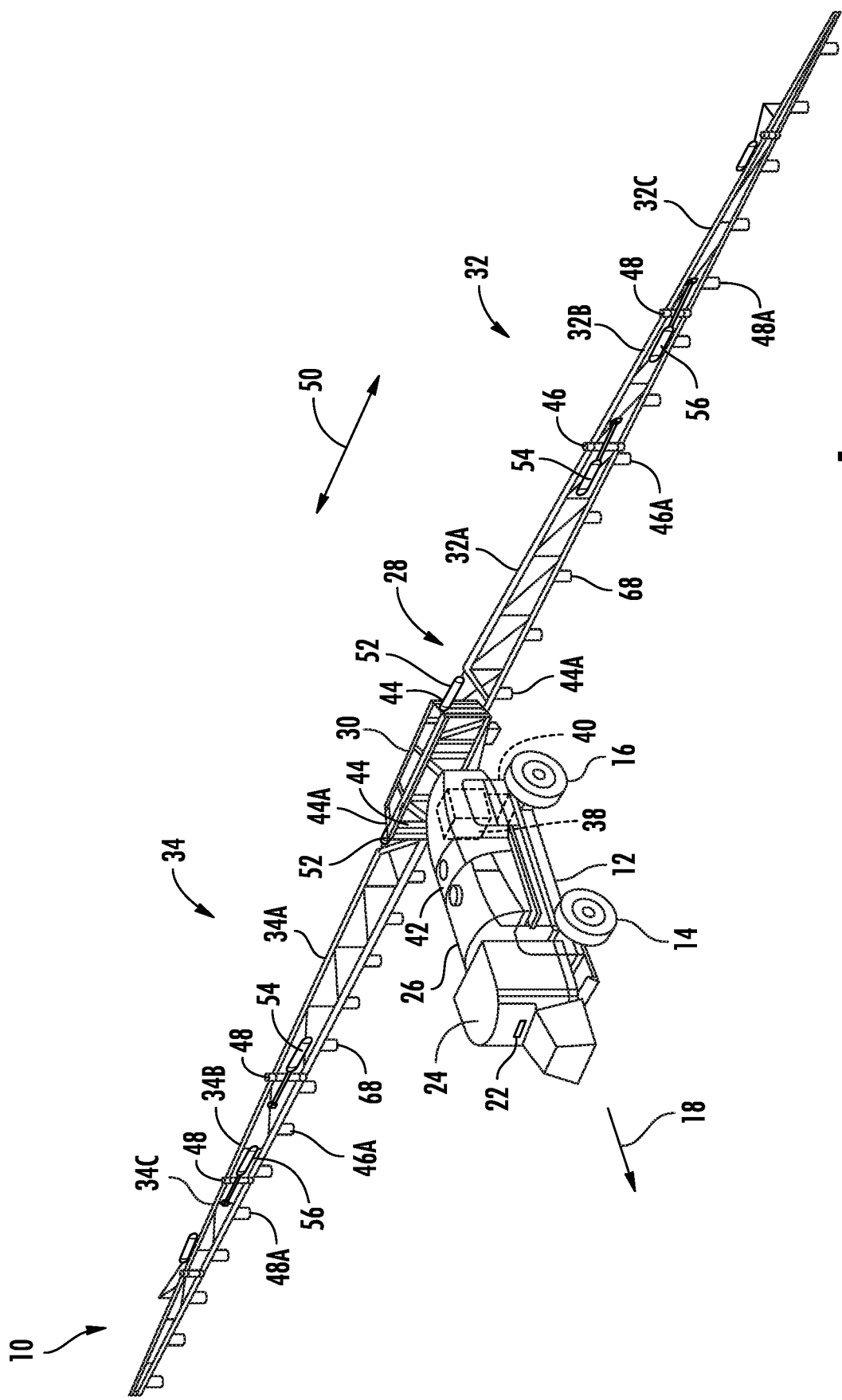
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is related to systems and methods for monitoring a level of hydraulic fluid in an agricultural sprayer. For example, the agricultural sprayer may include a hydraulic fluid system having a hydraulic fluid reservoir. The hydraulic fluid system may supply hydraulic fluid (e.g., oil) from the hydraulic fluid reservoir to one or more hydraulic fluid components during operation of the agricultural sprayer. The hydraulic fluid components of the agricultural sprayer may include a hydrostatic drive unit, a hydraulic actuator, a hydraulic motor, and/or any other suitable hydraulic components.

In some operational instances, leaks in the hydraulic fluid system may occur, which may result in loss of hydraulic fluid. In such instances, the present system is operable to detect the leaks in the hydraulic fluid system and automatically reduce a ground speed of the agricultural sprayer, which may slow or stop the leaks in the hydraulic fluid system (thereby preventing damage to the agricultural sprayer). For example, the system may include a fill level sensor positioned in the hydraulic fluid system that monitors a level of hydraulic fluid within the hydraulic fluid system. The fill level sensor may detect the presence of a leak in the hydraulic fluid system when the level of hydraulic fluid drops at a rate over a time period (e.g., 1-5 seconds) that exceeds a predetermined threshold rate. In response, the system may automatically reduce the ground speed of the agricultural sprayer, thereby reducing the rate at which the hydraulic fluid is lost due to the leak. Such a responsive action may preserve the remaining hydraulic fluid in the hydraulic fluid system and prevent damage to the agricultural sprayer that may otherwise occur if the leak were to progress.

Referring now to FIG. 1, one embodiment of an agricultural sprayer 10 is illustrated in accordance with aspects of the present subject matter. Specifically, FIG. 1 illustrates a perspective view of the sprayer 10 with its boom assembly in a working or unfolded position. In many implementations, the boom assembly may be foldable and/or collapsible into a transport or folded position (not shown). In the illustrated embodiment, the agricultural sprayer 10 is configured as a self-propelled agricultural sprayer. However, in alternative embodiments, the agricultural sprayer 10 may be configured as any other suitable type of agricultural sprayer 10 configured to perform agricultural spraying operations, such as a tractor or other vehicle configured to haul a spraying or application implement.

As shown in FIG. 1, the agricultural sprayer 10 may include a chassis 12 or frame configured to support or couple to a plurality of components. For example, a pair of steerable front wheels 14 (one is shown) and a pair of driven rear wheels 16 (one is shown) may be coupled to the chassis 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine 38 and a transmission 40 configured to transmit power from the engine 38 to the wheels 14, 16. However, it will be appreciated that, in further embodiments, the front wheels 14 of the agricultural sprayer 10 may be driven in addition to or in lieu of the rear wheels 16. The chassis 12 may also support an operator's cab 24 that houses various control or input devices (e.g., levers, pedals, control panels, buttons, and/or the like) for permitting an operator to control the operation of the work sprayer 10. For instance, as shown in FIG. 1, the agricultural sprayer 10 may include a human-machine or user interface 22 for displaying message windows and/or alerts to the operator and/or for allowing the operator to interface with the vehicle's controller or computing system. In some embodiments, the user interface 22 may include joysticks, buttons, knobs and/or any other suitable input devices that allow the operator to provide user inputs to an associated controller or computing system.

Furthermore, the chassis 12 may also support at least one or more product tanks 26 and/or one or more auxiliary tanks 42. Each product tank 26 is generally configured to store or hold an agricultural product, such as a pesticide, an herbicide, a nutrient, and/or the like. The auxiliary tank 42 may be configured to store or hold clean water and/or any other product, which may be different from the agricultural product within the product tank 26.

The chassis 12 may further support a frame or boom assembly 28 mounted on the chassis 12. A plurality of nozzle assemblies 68 are mounted on the boom assembly 28 and configured to selectively dispense the agricultural product stored in the associated product tank 26 and/or the auxiliary tank 42 via the nozzle assemblies 68 onto underlying plants and/or soil. The nozzle assemblies 68 are generally spaced apart from each other on the boom assembly 28 along a lateral direction 50. Furthermore, fluid conduits may fluidly couple the nozzle assemblies 68 to the tank(s) 26, 42. Each nozzle assembly 68 may include a nozzle valve and an associated spray tip or spray nozzle. In several embodiments, the operation of each nozzle valve may be individually controlled by an associated controller or computing system such that the valve regulates the flow rate and/or other spray characteristic of the agricultural product through the associated spray nozzle.

In some embodiments, to improve the agricultural product application quality and/or operator comfort, the sprayer 10 can be equipped with a passive, semi-active, or active suspension system 31 (FIG. 2) to dampen movement of the sprayer 10 during operation. For instance, the suspension system 31 may be configured to isolate the cab 24 and/or the boom assembly 28 from vibrations caused by uneven terrain.

The boom assembly 28 of the agricultural sprayer 10 may generally be movable between a working or unfolded position (FIG. 1) and a transport or folded position (not shown). In the working position, various sections of the boom assembly 28 are fully extended such that the boom assembly 28 extends over as wide a section of a field as possible. In the transport position, the various sections of the boom assembly 28 are fully retracted to reduce the width of the sprayer 10 for travel. As will be described below, the boom assembly 28 may include a plurality of fold actuators coupled between adjacent boom sections of the boom assembly 28 for moving the boom assembly 28 between the working and transport positions.

As shown in FIG. 1, in various embodiments, the boom assembly 28 includes a central boom section 30, a left boom arm 32, and a right boom arm 34. The left boom arm 32 includes a left inner boom section 32A pivotably coupled to the central boom section 30, a left middle boom section 32B pivotably coupled to the left inner boom section 32A, and a left outer boom section 32C pivotably coupled to the left middle boom section 32B. Similarly, the right boom arm 34 includes a right inner boom section 34A pivotably coupled to the central boom section 30, a right middle boom section 34B pivotably coupled to the right inner boom section 34A, and a right outer boom section 34C pivotably coupled to the right middle boom section 34B. Each of the inner boom sections 32A, 34A is pivotably coupled to the central boom section 30 at pivot joints 44. Similarly, the middle boom sections 32B, 34B are pivotably coupled to the respective inner boom sections 32A, 34A at pivot joints 46 while the outer boom sections 32C, 34C are pivotably coupled to the respective middle boom sections 32B, 34B at pivot joints 48.

As is generally understood, pivot joints 44, 46, 48 may be configured to allow relative pivotal motion between adjacent boom sections of the boom assembly 28. For example, the pivot joints 44, 46, 48 may allow for articulation of the various boom sections between a fully extended or working position (e.g., as shown in FIG. 1), in which the boom sections are unfolded along the lateral direction 50 to allow for the performance of an agricultural spraying operation, and a transport position, in which the boom sections are folded inwardly to reduce the overall width of the boom assembly 28 along the lateral direction 50. It will be appreciated that, although the boom assembly 28 is shown in FIG. 1 as including a central boom section and three individual boom sections coupled to each side of the central boom sections, the boom assembly 28 may generally have any suitable number of boom sections. For example, in other embodiments, each boom arm 32, 34 may include four or more boom sections or less than three boom sections.

Additionally, as shown in FIG. 1, the boom assembly 28 may include inner fold actuators 52 coupled between the inner boom sections 32A, 34A and the central boom section 30 to enable pivoting or folding between the fully-extended working position and the transport position. For example, by retracting/extending the inner fold actuators 52, the inner boom sections 32A, 34A may be pivoted or folded relative to the central boom section 30 about a pivot axis 44A defined by the pivot joints 44. Moreover, the boom assembly 28 may also include middle fold actuators 54 coupled between each inner boom section 32A, 34A and its adjacent middle boom section 32B, 34B and outer fold actuators 56 coupled between each middle boom section 32B, 34B and its adjacent outer boom section 32C, 34C. As such, by retracting/extending the middle and outer fold actuators 54, 56, each middle and outer boom section 32B, 34B, 32C, 34C may be pivoted or folded relative to its respective inwardly adjacent boom section 32A, 34A, 32B, 34B about a respective pivot axis 46A, 48A. When moving to the transport position, the boom assembly 28 and fold actuators 52, 54, 56 are typically oriented such that the pivot axes 44A, 46A, 48A are parallel to the vertical direction 58 and, thus, the various boom sections 32A, 34A, 32B, 34B, 32C, 34C of the boom assembly 28 are configured to be folded horizontally (e.g., parallel to the lateral direction 50) about the pivot axes 44A, 46A, 48A to keep the folding height of the boom assembly 28 as low as possible for transport. However, the pivot axes 44A, 46A, 48A may be oriented along any other suitable direction.

In some embodiments, the boom assembly 28 may include a mast coupled to a frame that, in combination, can support the boom assembly 28 relative to the sprayer chassis 12. For example, the mast may be configured to couple to the chassis 12 via a linkage assembly to transfer a load of the frame to the mast. Furthermore, a boom suspension can extend between the frame and the mast and can be configured to dampen movement of the frame relative to the mast, thereby providing a stable platform for the boom assembly 28. In some examples, the boom suspension can include one or more actuators that can be configured to mechanically interconnect the frame to the mast. The one or more actuators may be capable of generally leveling the boom assembly 28 relative to the ground surface. In addition to aiding in leveling the boom assembly 28, the adjustable suspension can also provide various damping levels and/or rigidly couple the frame and the mast to one another.

It will be appreciated that, although not shown in FIG. 1, the sprayer 10 may also include various sensors configured to capture data indicative of one or more operating conditions or parameters associated with the performance and/or operation of the sprayer 10. For instance, in some embodiments, sensors may, for example, be installed on the boom assembly 28 to allow operating parameter/conditions associated with the boom to be monitored. However, in other embodiments, one or more sensors may be installed relative to or in association with any other suitable components, features, systems, and/or sub-systems of the sprayer 10.

Figure 2:
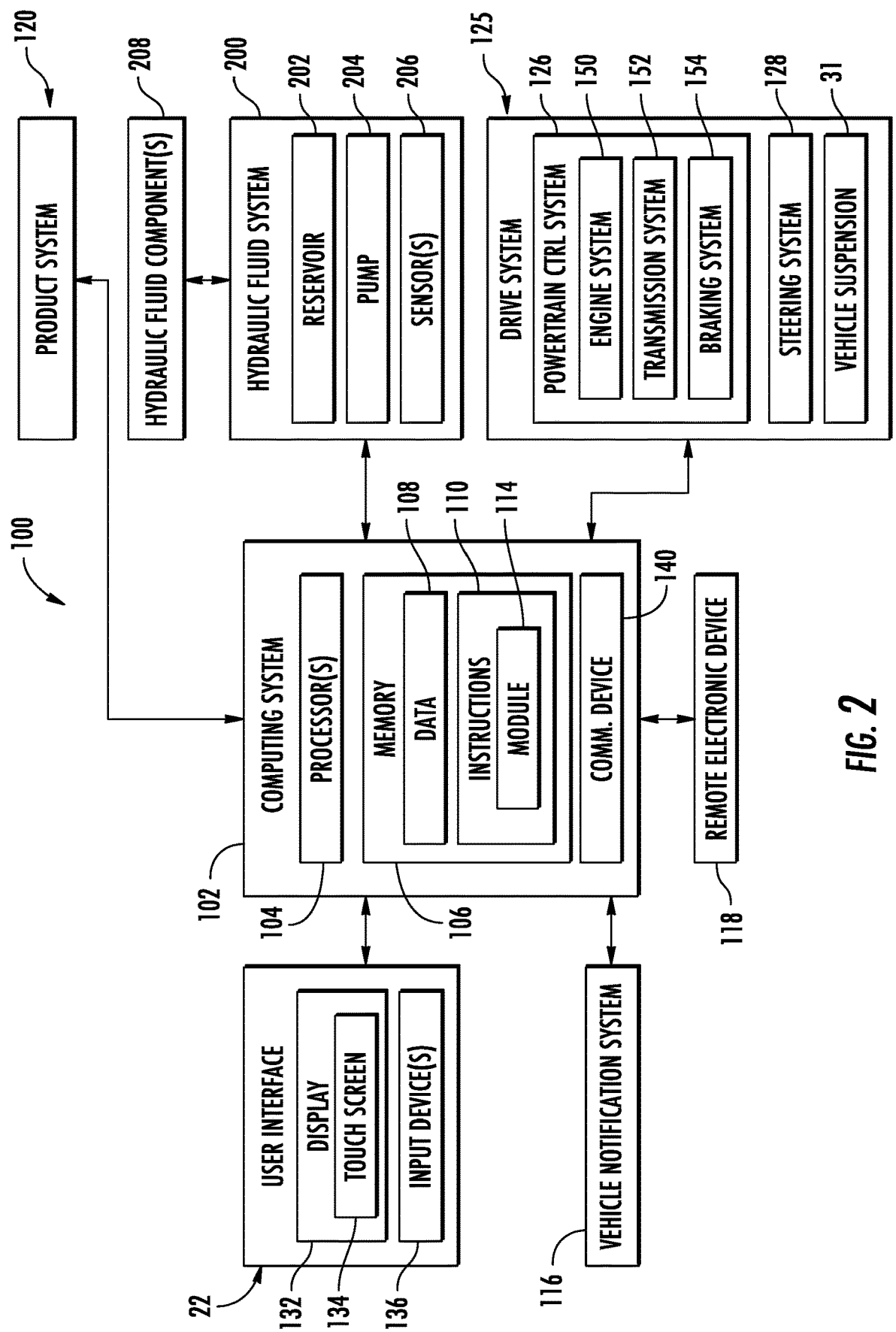
FIG. 2 illustrates a schematic view of one embodiment of a sprayer system configured for use in association with an agricultural sprayer in accordance with aspects of the present subject matter.

Referring now to FIG. 2, a schematic view of one embodiment of a sprayer system 100 configured to form part of or otherwise be associated with an agricultural sprayer 10 is illustrated in accordance with aspects of the present subject matter. In general, the system 100 will be described herein with reference to the sprayer 10 described above with reference to FIG. 1. However, it will be appreciated that the disclosed system 100 may generally be utilized with sprayers or other agricultural applicators having any suitable configuration consistent with the disclosure provided herein.

In several embodiments, the system 100 may include a computing system 102 and various components, features, systems and/or sub-systems configured to be communicatively coupled to the computing system 102. In general, the computing system 102 may be configured to perform various computer-related functions or tasks, including, for example, receiving data from one or more components, features, systems and/or sub-systems of the sprayer 10, storing and/or processing data received or generated by the computing system 102, and/or controlling the operation of one or more components, features, systems and/or sub-systems of the sprayer 10.

In general, the computing system 102 may correspond to any suitable processor-based device(s), such as a computing device or any combination of computing devices. Thus, as shown in FIG. 2, the computing system 102 may generally include one or more processor(s) 104 and associated memory devices 106 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 106 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 106 may generally be configured to store information accessible to the processor(s) 104, including data 108 that can be retrieved, manipulated, created and/or stored by the processor(s) 104 and instructions 110 that can be executed by the processor(s) 104.

In several embodiments, the data 108 may be stored in one or more databases. For example, the memory device 106 may include various databases for storing data associated with the operation of the sprayer 10, such as operation data, sensor data, field data, map data, application data, agricultural product data, correlation tables, and/or the like. Such data may include, for example, information received from one or more components, features, systems and/or sub-systems of the sprayer 10. For instance, the computing system 102 may be communicatively coupled to the product system 120, the user interface 22, and a hydraulic fluid system 200.

Referring still to FIG. 2, in several embodiments, the instructions 110 stored within the memory device 106 of the computing system 102 may be executed by the processor(s) 104 to implement one or more modules 114, such as a data analysis module or an active control module. For example, a data analysis module may be executed or implemented by processor(s) 104 to analyze data received from one or more components, features, systems, and/or sub-systems of the sprayer 10 (e.g., sensors, etc.).

For instance, the data analysis module may receive data from a fill level sensor 206 of the hydraulic fluid system 200. The data received from the fill level sensor 206 is associated with a level (e.g., volume of hydraulic fluid) within a hydraulic fluid reservoir 202 of the hydraulic fluid system 200. For example, based on data received from the fill level sensor 206, the data analysis module of the computing system 102 may monitor (e.g., continuously monitor) a level of hydraulic fluid within the hydraulic fluid reservoir 202 of the hydraulic fluid system 200. Additionally, the data analysis module may be operable to detect a leak condition (such as a hydraulic fluid leak) in the hydraulic fluid system 200 based on data received from the fill level sensor 206. The leak condition may be a leak of hydraulic fluid from one or more hydraulic fluid components 208, the hydraulic fluid reservoir 202, and or a hydraulic fluid pump 204.

Particularly, the data analysis module of the computing system 102 may detect a leak condition within the hydraulic fluid system 200 when it is determined that the level of hydraulic fluid within the hydraulic fluid reservoir 202 has dropped at a first rate over a first time period that exceeds a threshold rate value. Additionally or alternatively, the data analysis module of the computing system 102 may detect a leak condition within the hydraulic fluid system 200 when it is determined that the level of hydraulic fluid within the hydraulic fluid reservoir 202 has dropped below a threshold level value.

In exemplary implementations, the data analysis module of the computing system 102 may advantageously distinguish between normal operating conditions of the hydraulic fluid system 200 and a leak condition of the hydraulic fluid system 200, such that the data analysis module will not mistakenly identify normal operation of the hydraulic fluid system 200 as a leak condition. For example, when the agricultural machine 10 performs a function or operation requiring hydraulic fluid (such as extending the boom assembly 14), the hydraulic fluid level within the hydraulic fluid reservoir 202 will drop, and the data analysis module will not mistakenly identify said drop as a leak condition of the hydraulic fluid system 200. In this way, the threshold rate value, which must be exceeded or surpassed in order to determine a leak condition, may be different depending on the operating state of the agricultural machine 10. For example, when the agricultural machine is performing an operation requiring large amounts of hydraulic fluid, the threshold rate value may be set higher. Likewise, when the agricultural machine is in steady state operation, the threshold rate value may be set lower. Alternatively, the threshold rate value may be the same for every operating state of the agricultural machine, such that it may be a constant value. Additionally, the hydraulic fluid level within the hydraulic fluid reservoir 202 may change based on thermal expansion and/or contraction and the compressibility of the hydraulic fluid (e.g., oil). The present system is robust to such variations and will adjust the threshold rate value to not mistakenly identify these occurrences as a leak condition of the hydraulic fluid system 200.

Additionally, the active control module may be executed or implemented by the processor(s) 104 to alter or operate one or more systems of the agricultural machine 10 in response to detecting the leak condition. For example, in exemplary implementations, once the data analysis module has detected a leak condition, the active control module may alter a ground speed of the agricultural machine 10 by operating the drive system 125. In many implementations, the ground speed of the agricultural machine 10 may be directly proportional to the speed of the hydraulic fluid pump 204 of the hydraulic fluid system 200, with which the hydraulic fluid from the reservoir 202 is supplied to one or more hydraulic fluid components 208 of the sprayer 10. In this way, reducing the ground speed of the agricultural machine 10 in response to detecting the leak condition in the hydraulic fluid system 200 reduces the rate at which hydraulic fluid is pumped throughout the system 200, thereby preserving and preventing damage to the agricultural machine 10.

Additionally, the active control module may be executed or implemented by the processor(s) 104 to provide notification instructions to the user interface 22, a related vehicle notification system 116 (e.g., including components configured to provide visual, auditory, or haptic feedback, such as lights, speakers, vibratory components, and/or the like), and/or a remote electronic device 118. Particularly, the active control module may provide notification instructions to the user interface 22 when a leak condition within the hydraulic fluid system 200 is detected by the data analysis module of the computing system 102 (e.g., in the form of a warning via the components configured to provide visual, auditory, or haptic feedback, such as lights, speakers, vibratory components, and/or the like).

In addition, various other components may be adjusted or controlled by the computing system 102 via execution or implementation of the active control module. For instance, the computing system 102 may be configured to adjust or control or the operation of one or more components, sub-systems, or systems of the drive system 125, such as by controlling the operation of a powertrain control system 126, a steering system 128, the sprayer suspension system 31, and/or the like.

In some examples, the user interface 22 may be mounted within a cockpit module, an instrument cluster, and/or any other location within the cab 24. Additionally or alternatively, the user interface 22 may be mounted on an exterior portion of the sprayer 10.

In various examples, the user interface 22 of the disclosed system 100 may include a display 132 having a touchscreen 134. The display 132 may be capable of displaying information related to the operation of the sprayer 10. In some embodiments, the display 132 may include an input device in the form of circuitry within the touchscreen to receive an input corresponding with a location over the display 132. Additionally, the user interface 22 may also include various other types or forms of input devices 136, such as one or more joysticks, buttons, knobs, levers, input pads, and/or the like.

In several embodiments, the computing system 102 may be configured to communicate via wired and/or wireless communication with one or more remote electronic devices 118 through a communications device 140 (e.g., a transceiver). The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. The electronic device 118 may include a display for displaying information to a user. For instance, the electronic device 118 may display one or more graphical user interfaces and may be capable of receiving remote user inputs associated with adjusting operating variables or thresholds associated with the sprayer 10. In addition, the electronic device 118 may provide feedback information, such as visual, audible, and tactile alerts and/or allow the operator to alter or adjust one or more components, features, systems, and/or sub-systems of the sprayer 10 through usage of the remote electronic device 118. It will be appreciated that the electronic device 118 may be any one of a variety of computing devices and may include a processor and memory. For example, the electronic device 118 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Figure 3:
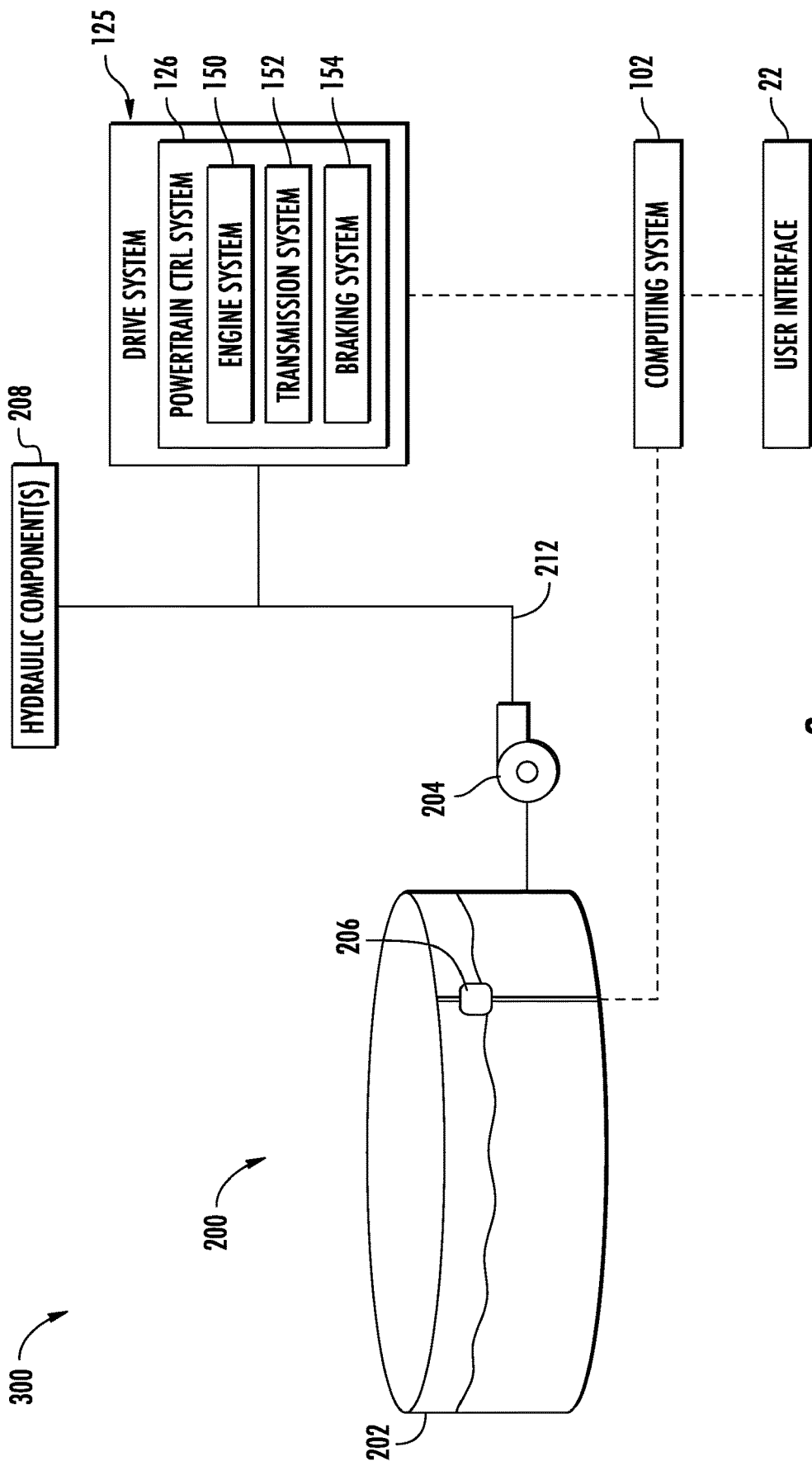
FIG. 3 illustrates a schematic view of one embodiment of a hydraulic fluid system configured for use in association with an agricultural sprayer in accordance with aspects of the present subject matter.

Referring now to FIG. 3, a schematic view of one embodiment of a system 300 for monitoring a level of hydraulic fluid in an agricultural sprayer 10 is illustrated in accordance with aspects of the present subject matter. In general, the system 300 will be described herein with reference to the agricultural sprayer 10 shown and described with reference to FIG. 1 and various components of the sprayer system 100 shown and described above with reference to FIG. 2. However, it will be appreciated by those of ordinary skill in the art that the disclosed system 300 may generally be utilized with any suitable agricultural sprayer and/or may be utilized in connection with a system having any other suitable system configuration.

As shown, the system 300 may include a drive system 125 configured to control a ground speed of the agricultural sprayer 10. For example, in some embodiments, the drive system 125 may include a powertrain control system 126. The powertrain control system 126 includes an engine output control system 150, a transmission control system 152, and a braking control system 154. The engine output control system 150 is configured to vary the output of the engine 38 (FIG. 1) to control the ground speed of the sprayer 10 (e.g., the speed at which the sprayer 10 traverses the ground). For example, the engine output control system 150 may vary a throttle setting of the engine 38, a fuel/air mixture of the engine 38, a timing of the engine 38, and/or other suitable engine parameters to control engine output. In addition, the transmission control system 152 may adjust gear selection within a transmission 40 (FIG. 1) to control the speed of the sprayer 10. Furthermore, the braking control system 154 may adjust braking force, thereby controlling the speed of the sprayer 10. While the illustrated powertrain control system 126 includes the engine output control system 150, the transmission control system 152, and the braking control system 154, it will be appreciated that alternative embodiments may include one or two of these systems, in any suitable combination. Further embodiments may include a powertrain control system 126 having other and/or additional systems to facilitate adjusting the speed of the sprayer 10.

Additionally, the drive system 125 may be operable to control and/or adjust the engine output control system 150 to control one or more engine parameters. For example, engine output control system 150 may be configured to vary the input/output of the engine 38 (FIG. 1) to limit or control the one or more engine parameters (such as engine torque or rotational speed). As discussed below, these parameters may be reduced and/or limited by the engine output control system 150 in response to detecting a leak condition in the hydraulic fluid system 200 to prevent damage to the agricultural sprayer 10.

In exemplary embodiments, as shown, the system 300 may further include a hydraulic fluid system 200 operable to deliver hydraulic fluid 210 (such as oil, oil and water, mineral oil, or other suitable hydraulic fluids) to various hydraulic component(s) 208 of the agricultural sprayer 10. The hydraulic fluid system may include a hydraulic fluid reservoir 202 that contains or houses the hydraulic fluid 210. As shown, the hydraulic fluid 210 from the hydraulic fluid reservoir 202 may be in fluid communication with one or more hydraulic fluid component(s), such that the hydraulic fluid 210 may be supplied to the one or more hydraulic fluid component(s) 208 during operation of the agricultural sprayer 10. For example, in some embodiments, the hydraulic fluid system 200 may include a hydraulic fluid pump 204 disposed in fluid communication with a hydraulic fluid line 212 such that the hydraulic fluid pump 204 is configured to supply a flow of the hydraulic fluid 210 from the hydraulic fluid reservoir 202 to at least one hydraulic component 208 of the agricultural sprayer 10. Additionally or alternatively, as shown, the hydraulic fluid system 200 may be in fluid communication with the drive system 125 (e.g., via the hydraulic fluid line 212), such that a flow of hydraulic fluid 210 is conveyed from the hydraulic fluid reservoir 202 to the drive system 125. In other embodiments (not shown), the drive system 125 may not be fluidly coupled to the hydraulic fluid system 200, such that the drive system 125 may be fluidly isolated from the hydraulic fluid system 200.

Additionally, the hydraulic fluid system 200 may include a fill level sensor 206 configured to provide data indicative of the level (e.g., a volume or amount) of hydraulic fluid 210 within the hydraulic fluid reservoir 202. For example, the fill level sensor 206 may be disposed within the hydraulic fluid reservoir 202 and in communication with a computing system (e.g., computing system 102 of FIG. 2) such that the computing system 102 may monitor the level of hydraulic fluid 210 within the reservoir (and the entire hydraulic fluid system 200) based on data received from the fill level sensor 206. The fill level 206 sensor may be any suitable sensor capable of capturing data indicative of a level (or volume) of hydraulic fluid 210 within the hydraulic fluid reservoir. For example, in exemplary embodiments, the fill level sensor may be a float level sensor, which may include a float that rises and falls as the hydraulic fluid 210 levels rise and lower in the hydraulic fluid reservoir 202.

In many embodiments, as shown in FIG. 3, the computing system 102 may be communicatively coupled to both the drive system 125 and the fill level sensor 206 (as indicated by the dashed lines in FIG. 3). The computing system 102 may be operable to monitor (e.g., continuously monitor) the level of hydraulic fluid 210 within the hydraulic fluid reservoir 202 based on data received from the fill level sensor 206. In this way, the computing system 102 may receive data indicative of the amount of hydraulic fluid 210 within the hydraulic fluid system 200, such that the computing system 102 may detect when the hydraulic fluid 210 level increases and decreases within the hydraulic fluid reservoir 202. For example, the computing system 102 may be operable to detect a leak condition in the hydraulic fluid system 200 based at least in part on the monitored level of the hydraulic fluid 210 within the hydraulic fluid reservoir 202.

In various embodiments, the leak condition in the hydraulic fluid system 200 may be indicative of a leak in hydraulic fluid 210 (e.g., one or more components of the hydraulic fluid system is losing or expelling hydraulic fluid 210, such as from a crack or compromised joint/weld). The leak condition in the hydraulic fluid system 200 may be determined in one or more ways by the computing system 102. For example, in exemplary implementations, the leak condition in the hydraulic fluid system 200 may be detected when the computing system 102 determines that the level of hydraulic fluid 210 within the hydraulic fluid reservoir 202 has dropped at a first rate over a first time period (e.g., between about 1 second and about 5 seconds) that exceeds a threshold rate value. Additionally or alternatively, the leak condition may be detected when the computing system 102 determines that the level of hydraulic fluid 210 within the hydraulic fluid reservoir 202 has dropped below a threshold level value.

In response to detecting the leak condition in the hydraulic fluid system 200, the computing system 102 may be configured to control an operation of the drive system 125 to reduce the ground speed of the agricultural sprayer 10. In particular implementations, after initially detecting the leak condition, the computing system 102 may control the operation of the drive system 125 to reduce the ground speed of the agricultural sprayer 10 to a predetermined speed, such as a ground speed between about 5 miles per hour and about 15 miles per hour, such as between about 7 miles per hour and about 12 miles per hour, such as about 10 miles per hour. Reducing the ground speed of the agricultural sprayer 10 (specifically to a speed identified in the ranges above) may advantageously allow for continued operation of the agricultural sprayer 10, without risk of damage due to lack of hydraulic fluid 210. For example, this control action may reduce or entirely prevent the rate at which hydraulic fluid 210 is leaked from the hydraulic fluid system 200 during the leak condition, which may allow the agricultural sprayer 10 to safely travel to a location where a repair can be made.

After the ground speed of the sprayer 10 is initially reduced in response to detecting the leak condition, the computing system 102 may continue to monitor the level of the hydraulic fluid 210 within the hydraulic fluid reservoir 202 (e.g., based on data received from the fill level sensor 206). This may advantageously allow the computing system 102 to determine if the leak condition still exists after initially reducing the ground speed of the sprayer 10 (e.g., the hydraulic fluid system 200 is continuing to lose hydraulic fluid 210 even after the ground speed of the sprayer 10 has been initially reduced). For example, in exemplary embodiments, the computing system 102 may detect that the leak condition has been maintained or progressed (i.e., worsened) when it is determined that the level of the hydraulic fluid 210 within the hydraulic fluid reservoir 202 has dropped at a second rate over a second time period that exceeds the threshold rate value. In response, the computing system 102 may control the operation of the drive system 125 to reduce the ground speed of the agricultural sprayer 10 further, such as by reducing the ground speed to zero. When reducing the ground speed of the agricultural sprayer 10 to zero, the speed of the hydraulic fluid pump 204 may also be reduced to zero, thereby stopping the flow of hydraulic fluid 210 throughout the hydraulic fluid system 200. In some implementations, the second period of time may begin immediately after the ground speed is initially reduced in response to initially detecting the leak condition. Alternatively, the second time period may begin at any point after the ground speed is initially reduced in response to initially detecting the leak condition.

In other embodiments, the ground speed of the agricultural sprayer 10 may be iteratively reduced in order to clear or overcome the leak condition (or until the agricultural sprayer 10 is halted/stopped). For example, in response to initially detecting the leak, the ground speed of the sprayer 10 may be reduced (e.g., by about 50% or to about 10 miles per hour). After initially reducing the ground speed, if the computing system 102 determines the leak condition has been maintained, the ground speed of the sprayer 10 may be reduced again (e.g., by about 50% or to about 5 miles per hour). This process may be repeated until the leak condition in the hydraulic fluid system 200 is cleared or the agricultural sprayer 10 is completely stopped (e.g., having a ground speed of zero).

In exemplary implementations, reducing the ground speed of the agricultural sprayer 10 advantageously reduces the rate at which the hydraulic fluid 210 is pumped throughout the system 300, thereby reducing the rate at which the hydraulic fluid is lost due to the leak condition. Such a responsive action may preserve the remaining hydraulic fluid 210 in the reservoir and prevent damage to the agricultural sprayer 10 that may otherwise occur if the leak condition were to progress. For example, in many implementations, the ground speed of the agricultural machine 10 may be directly proportional to the speed of the hydraulic fluid pump 204, with which the hydraulic fluid from the reservoir 202 is supplied to one or more hydraulic fluid components 208. For example, increasing the ground speed of the sprayer 10 will increase the operational speed of the hydraulic fluid pump 204, and likewise, reducing the ground speed of the sprayer 10 will reduce the operational speed of the hydraulic fluid pump 204. In this way, reducing the ground speed of the agricultural sprayer 10 in response to detecting the leak condition in the hydraulic fluid system 200 proportionally reduces the rate at which hydraulic fluid is pumped throughout the system 200, thereby preserving and preventing damage to the hydraulic fluid system 200 agricultural machine 10. For example, by reducing the pump speed, the rate at which hydraulic fluid 210 is leaked from the system during the leak condition may be reduced or entirely prevented. This may allow the agricultural sprayer 10 to safely travel to a location where repairs can be made to cure the leak condition in the hydraulic fluid system 200.

In addition to reducing the ground speed of the sprayer 10 in response to detecting the leak condition (or as an alternative thereto), the computing system 102 may be configured to control one or more engine parameters of an engine system 150 of the drive system 125, such as reducing engine torque or engine speed (RPMs). For example, the computing system may control the operation of the drive system 125 to reduce one or more of the engine parameters in response to detecting the leak condition. Particularly, in some implementations, in response to detecting the leak condition, the computing system 102 may control the operation of the drive system 125 to reduce and/or limit the engine speed to between about 1200 RPM and about 1400 RPM.

In many embodiments, as shown in FIG. 3, the computing system 102 may be communicatively coupled to a user interface 22 of the agricultural sprayer 10. In such embodiments, the computing system 102 may transmit notification instructions to the user interface 22 when a leak condition within the hydraulic fluid system 200 is detected by the data analysis module of the computing system 102 (e.g., in the form of a warning via the components configured to provide visual, auditory, or haptic feedback, such as lights, speakers vibratory components, and/or the like). The notification instructions may notify the operator of the agricultural sprayer 10 that a leak condition has been detected.

As shown and described above, the system 300 may include at least one hydraulic component 208 fluidly coupled to the hydraulic fluid system 200 (e.g., via the hydraulic fluid line 212). The hydraulic component(s) 208 may be any suitable component of the agricultural sprayer 10 that utilizes hydraulic fluid 210, such as a hydrostatic drive unit, a hydraulic actuator (such as one or more of the actuators 52, 54, and/or 56), a hydraulic motor, and/or any other suitable hydraulic components. In some embodiments, the hydraulic component(s) 208 may be a component of the drive system 125, such as the engine system 150, the transmission system 152, the braking system 154, the steering system 128, the vehicle suspension system 31, and/or other suitable components of the drive system 125. In other embodiments (not shown), the drive system 125 may be fluidly independent from the hydraulic fluid system 200.

Figure 4:
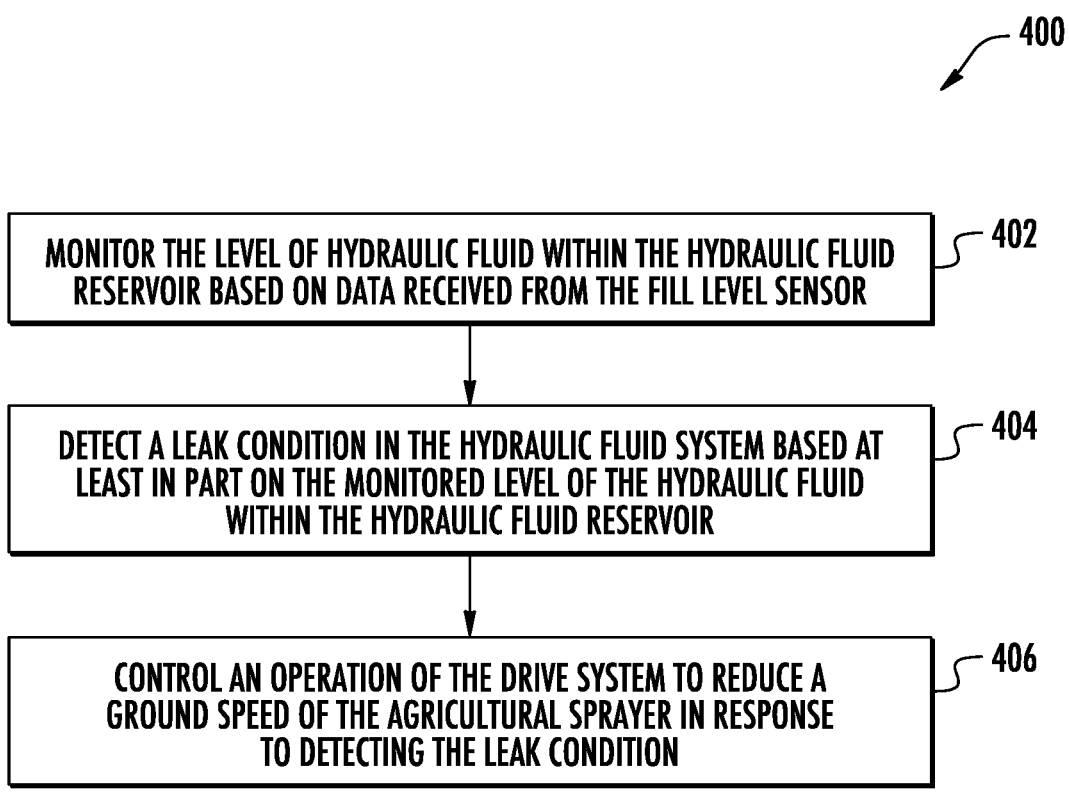
FIG. 4 illustrates a flow diagram of one embodiment of a method for monitoring a level of hydraulic fluid in an agricultural sprayer in accordance with aspects of the present subject matter.

Referring now to FIG. 4, a flow diagram of one embodiment of a method 400 for monitoring a level of hydraulic fluid in an agricultural sprayer is illustrated in accordance with aspects of the present subject matter. In general, the method 400 will be described herein with reference to the sprayer 10, the hydraulic fluid system 200, and the system 300 described above with reference to FIGS. 1-3. However, it will be appreciated by those of ordinary skill in the art that the disclosed method 400 may generally be utilized with any suitable agricultural sprayer 10 and/or may be utilized in connection with a system having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Additionally, dashed boxes in flow diagram of FIG. 4 indicate optional steps in the method 400.

As shown in FIG. 4, at (402), the method 400 includes monitoring (e.g., with a computing system) the level of hydraulic fluid within a hydraulic fluid reservoir of a hydraulic fluid system based on data received from a fill level sensor provided in association with the reservoir. As described above, the fill level sensor may be in communication with the computing system and may be any suitable sensor capable of capturing data indicative of a level (or volume) of hydraulic fluid within the hydraulic fluid reservoir. For example, in some embodiments, the fill level sensor may be a float level sensor, which may include a float that rises and falls as the hydraulic fluid levels rise and lower in the hydraulic fluid reservoir.

At (404), the method 400 may include detecting (e.g., with the computing system) a leak condition in the hydraulic fluid system based at least in part on the monitored level of the hydraulic fluid within the hydraulic fluid reservoir. In various embodiments, the leak condition may be detected in a number of ways by monitoring the data from the fill level sensor. However, in some embodiments, the leak condition may be detected when the computing system determines that the level of hydraulic fluid within the hydraulic fluid reservoir has dropped at a first rate over a first time period (e.g., between about 1 second and about 5 seconds) that exceeds a threshold rate value. Additionally or alternatively, the leak condition may be detected when the computing system determines that the level of hydraulic fluid within the hydraulic fluid reservoir has dropped below a threshold level value.

At (406), the method 400 may further include controlling (e.g., with the computing system) an operation of a drive system of the agricultural sprayer to reduce a ground speed of the agricultural sprayer in response to detecting the leak condition. For example, after initially detecting the leak condition, the computing system may control the operation of the drive system to reduce the ground speed of the agricultural sprayer (e.g., by reducing the ground speed to between about 5 miles per hour and about 15 miles per hour). For example, this control action may reduce (or entirely stop) the rate at which hydraulic fluid is leaked from the hydraulic fluid system during the leak condition, which may allow the agricultural sprayer to safely travel to a location where a repair can be made.

In some optional embodiments, the method may further include continuing to monitor the level of the hydraulic fluid within the hydraulic fluid reservoir after reducing the ground speed of the agricultural sprayer. In addition, the method may include determining that the level of hydraulic fluid within the hydraulic fluid reservoir has dropped at a second rate over a second time period that exceeds the threshold rate value. Further, the method may include controlling the operation of the drive system to reduce the ground speed of the agricultural sprayer to zero (e.g., stopping or halting the agricultural sprayer).

It is to be understood that the steps of any method disclosed herein may be performed by a computing system upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer readable medium. The computing system loads the software code or instructions via a direct interface with the computer readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring a level of hydraulic fluid in an agricultural sprayer, the system comprising:
    a drive system configured to control a ground speed of the agricultural sprayer;
    a hydraulic fluid system having a hydraulic fluid reservoir;
    a fill level sensor configured to provide data indicative of the level of hydraulic fluid within the hydraulic fluid reservoir;
    a computing system communicatively coupled to both the drive system and the fill level sensor, the computing system being configured to:
        monitor the level of hydraulic fluid within the hydraulic fluid reservoir based on data received from the fill level sensor;
        detect a leak condition in the hydraulic fluid system based at least in part on the monitored level of the hydraulic fluid within the hydraulic fluid reservoir; and
        control an operation of the drive system to reduce the ground speed of the agricultural sprayer in response to detecting the leak condition.

2. The system of claim 1, wherein the leak condition is detected when the computing system determines that the level of hydraulic fluid within the hydraulic fluid reservoir has dropped at a first rate over a first time period that exceeds a threshold rate value.

3. The system of claim 2, wherein the computing system is further configured to:
    continue to monitor the level of the hydraulic fluid within the hydraulic fluid reservoir upon reducing the ground speed of the agricultural sprayer;
    determine that the level of the hydraulic fluid within the hydraulic fluid reservoir has dropped at a second rate over a second time period that exceeds the threshold rate value; and
    control the operation of the drive system to reduce the ground speed of the agricultural sprayer to zero.

4. The system of claim 1, wherein the leak condition is detected when the computing system determines that the level of hydraulic fluid within the hydraulic fluid reservoir has dropped below a threshold level value.

5. The system of claim 1, wherein the computing system is configured to:
    control the operation of the drive system to reduce one or more engine parameters of the drive system in response to detecting the leak condition.

6. The system of claim 1, wherein the computing system is communicatively coupled to a user interface of the agricultural sprayer.

7. The system of claim 6, wherein the computing system is configured to provide notification instructions to the user interface when the leak condition is detected.

8. The system of claim 1, wherein the hydraulic fluid system includes a hydraulic fluid pump disposed in fluid communication with a hydraulic fluid line, the hydraulic fluid pump configured to supply a flow of the hydraulic fluid from the hydraulic fluid reservoir to at least one hydraulic component of the agricultural sprayer.

9. The system of claim 8, wherein the at least one hydraulic component comprises a component of the drive system.

10. The system of claim 8, wherein the ground speed of the agricultural sprayer is proportional to a pump speed of the hydraulic fluid pump.

11. A method for monitoring a level of hydraulic fluid in an agricultural sprayer, the agricultural sprayer including a drive system, a hydraulic fluid system having a hydraulic fluid reservoir, and a fill level sensor, the method comprising:
    monitoring, with a computing system, the level of hydraulic fluid within the hydraulic fluid reservoir based on data received from the fill level sensor;
    detecting, with the computing system, a leak condition in the hydraulic fluid system based at least in part on the monitored level of the hydraulic fluid within the hydraulic fluid reservoir; and
    controlling, with the computing system, an operation of the drive system to reduce a ground speed of the agricultural sprayer in response to detecting the leak condition.

12. The method of claim 11, wherein detecting the leak condition comprises determining that the level of hydraulic fluid within the hydraulic fluid reservoir has dropped at a first rate over a first time period that exceeds a threshold rate value.

13. The method of claim 11, further comprising:
    continuing, with the computing system, to monitor the level of the hydraulic fluid within the hydraulic fluid reservoir after reducing the ground speed of the agricultural sprayer;
    determining, with the computing system, that the level of hydraulic fluid within the hydraulic fluid reservoir has dropped at a second rate over a second time period that exceeds the threshold rate value; and
    controlling the operation of the drive system to reduce the ground speed of the agricultural sprayer to zero.

14. The method of claim 11, wherein detecting the leak condition comprises determining that the level of hydraulic fluid within the hydraulic fluid reservoir has dropped below a threshold level value.

15. The method of claim 11, wherein controlling the operation of the drive system comprises controlling an operation of the drive system to reduce one or more engine parameters in response to detecting the leak condition.

16. The method of claim 11, further comprising:
    providing, with the computing system, notification instructions to a user interface of the agricultural sprayer when the leak condition is detected.

17. The method of claim 11, further comprising:
controlling, with the computing system, an operation of a hydraulic fluid pump to supply a flow of the hydraulic fluid from the hydraulic fluid reservoir to at least one hydraulic component of the agricultural sprayer.

18. The method of claim 17, further comprising:
proportionally reducing a pump speed of the hydraulic fluid pump as a result of reducing the ground speed of the agricultural sprayer.

19. The method of claim 11, wherein reducing the ground speed comprises reducing the ground speed to between 5 miles per hour and 15 miles per hour in response to detecting the leak condition.

* * * * *